(12) United States Patent
Dropps et al.

(10) Patent No.: US 9,172,661 B1
(45) Date of Patent: Oct. 27, 2015

(54) METHOD AND SYSTEM FOR USING LANE ALIGNMENT MARKERS

(71) Applicant: QLOGIC, Corporation, Aliso Viejo, CA (US)

(72) Inventors: Frank R. Dropps, Maple Grove, MN (US); Ernest G. Kohlwey, Eagan, MN (US); Leo J. Slechta, Jr., Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 240 days.

(21) Appl. No.: 13/678,406

(22) Filed: Nov. 15, 2012

(51) Int. Cl.
  *H04L 12/28* (2006.01)
  *H04J 3/06* (2006.01)
  *H04L 12/931* (2013.01)

(52) U.S. Cl.
  CPC .................................. *H04L 49/352* (2013.01)

(58) Field of Classification Search
  USPC .................................................. 370/389, 350
  See application file for complete search history.

(56) References Cited

U.S. PATENT DOCUMENTS

| 7,839,839 B2 * | 11/2010 | Brown et al. ................. 370/350 |
| 7,869,468 B1 * | 1/2011 | Giannakopoulos et al. .. 370/535 |
| 8,305,925 B2 * | 11/2012 | Dong et al. .................... 370/253 |

OTHER PUBLICATIONS

Seventh Framework Program, D24.2:Report on Y1 and Updated Plan for Activities, Dec. 31, 2009, All.*
Network Test, Flexnetwork Architecture Delivers High Speed, Lower Downtime With HP IRF Technology, Aug. 2011, all.*

* cited by examiner

*Primary Examiner* — Omar Ghowrwal
*Assistant Examiner* — Angel Brockman
(74) *Attorney, Agent, or Firm* — Klein, O'Neill & Singh, LLP

(57) ABSTRACT

Method, system and network device for programming lane alignment markers are provided. The method includes configuring the first port having a plurality of sub-ports, as at least a dual lane port where each lane of the dual lane port is configured to receive and transmit frames; negotiating with the first network device to determine a lane alignment marker that is acceptable by the first network device; and programming the first port to identify the lane alignment marker associated with the vendor of the first network device for processing frames received from the first network device and transmitted to the first network device.

20 Claims, 7 Drawing Sheets

METHOD AND SYSTEM FOR USING LANE ALIGNMENT MARKERS

BACKGROUND

1. Technical Field

The present disclosure relates to network devices.

2. Related Art

Networking systems are commonly used to move network information (which may also be referred to interchangeably, as frames, packets or commands) between computing systems (for example, servers) or between computing systems and network devices (for example, switches). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. Continuous efforts are being made to enhance network communication using network devices.

SUMMARY

In one embodiment, a method for setting lane alignment markers in a network switch element connected to a first network device via a first port of the network switch element and a second network device via a second port is provided. The method includes configuring the first port having a plurality of sub-ports, as at least a dual lane port where each lane of the dual lane port is configured to receive and transmit frames; negotiating with the first network device to determine a lane alignment marker that is acceptable by the first network device; and programming the first port to identify the lane alignment marker associated with a vendor of the first network device for processing frames received from the first network device and transmitted to the first network device.

In another embodiment, a system having a first network device coupled to a first port of a network switch element; and a second network device coupled to a second port of the network switch element is provided. The first port having a plurality of sub-ports is configured as at least a dual lane port where each lane of the dual lane port is configured to receive and transmit frames. The first port negotiates with the first network device to determine a lane alignment marker that is acceptable by the first network device; and stores the lane alignment marker associated with a vendor of the first network device for processing frames received from the first network device and transmitted to the first network device.

In yet another embodiment, a network switch element having a processor for executing firmware code for managing network device operations is provided. The network switch element includes a first port coupled to a first network device, where the first port having a plurality of sub-ports is configured as at least a dual lane port where each lane of the dual lane port is configured to receive and transmit frames. The first port negotiates with the first network device to determine a lane alignment marker that is acceptable by the first network device; and stores the lane alignment marker associated with a vendor of the first network device for processing frames received from the first network device and transmitted to the first network device.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 1 is a functional block diagram of a network that the present embodiments may be used in connection with;

DETAILED DESCRIPTION

Figure 1:
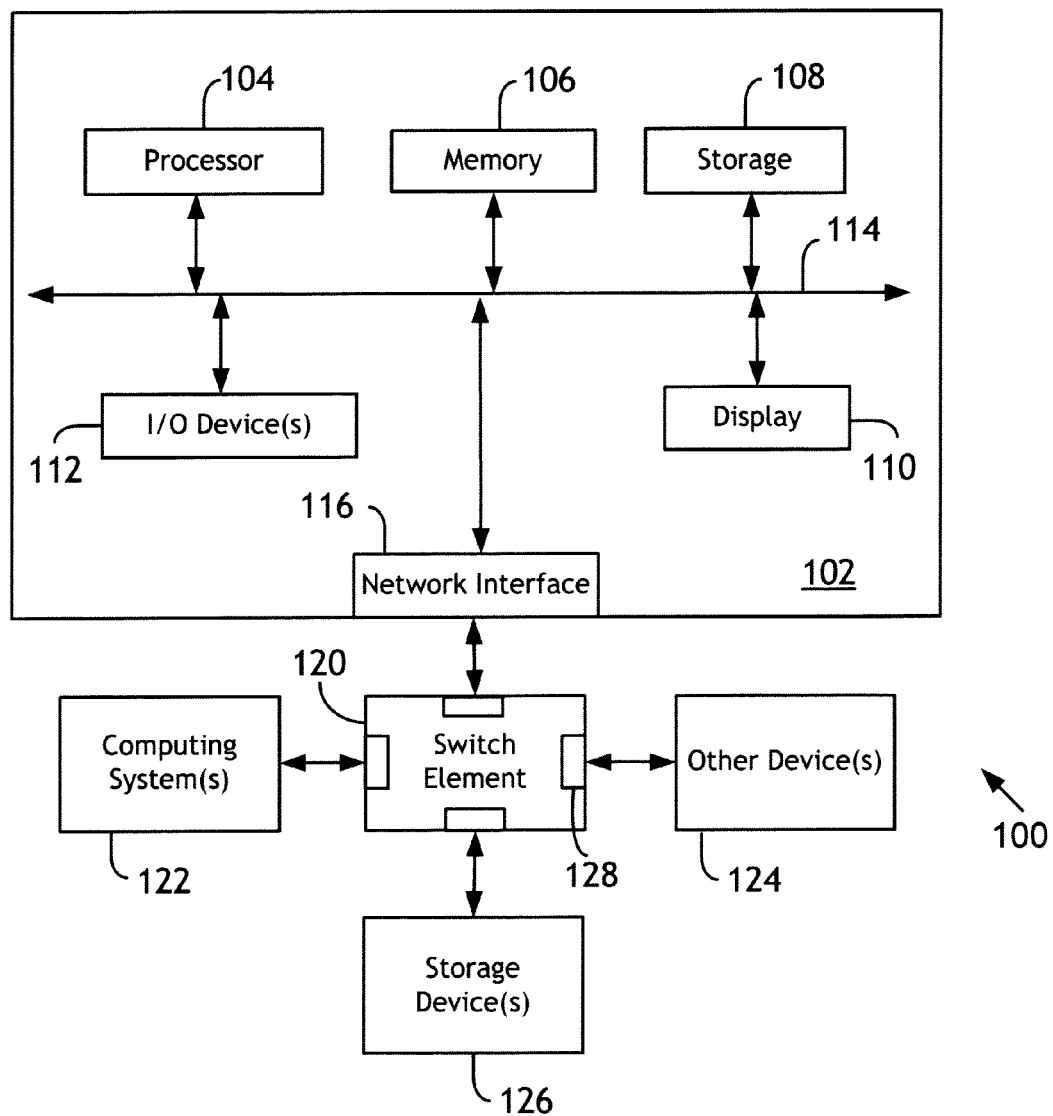

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The embodiments disclosed herein, may be implemented as a computer process (method), a computing system, or as an article of manufacture, such as a computer program product stored at a non-transitory computer-readable media. The computer program product may be non-transitory computer storage media, readable by a computer device, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches (or other devices, for example, adapters) use memory buffers to temporarily hold frames that are received and sent across a network. Associated with these buffers are credits, which are the number of frames that a buffer can hold per Fabric port.

Fibre Channel devices use the concept of "credits" for managing flow control when sending and receiving information. Typically, before a transmit port can transmit frames, a receiving port sends credit to the transmitting port indicating the number of frames that the receiving port can hold. The credits are based on the space that may be available at the receiving port, at any given time. Thus the transmitting port is only permitted to transmit frames when it has the necessary credits from the receiving port. This prevents situations where the receiving port may overflow with received frames. Fibre Channel ports use special primitives for providing credits. One such primitive is called an R-RDY that is used by a receiving port to grant credit to a transmit port. Another primitive is a VC_RDY primitive that is used when the receiving port is configured to use virtual lanes (or virtual circuits). Details regarding the use of R-RDYs and VC_RDYs are not germane to the adaptive embodiments disclosed herein.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety. Ethernet uses "Pause" frames for managing flow control. In Ethernet, a receive buffer may send a Pause frame indicating to the transmitting Ethernet port that it cannot receive a frame. Thus in this case, implicitly, the transmitting port is out of credit.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element (may be referred to as a network switch element or a network device) 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be an FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

The processor 104 of the host system 102 may execute various applications, for example, an e-mail server application, databases, and other application types. Data for various applications may be shared between the computing systems 122 and stored at the storage devices 126. Information may be sent via switch 120 ports. The term "port" as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 for the host system 102 and an interface for the storage devices 126. Fabric ports are typically located in Fabric devices, such as the switch element 120. Details regarding the switch element 120 are provided below.

Figure 2A:
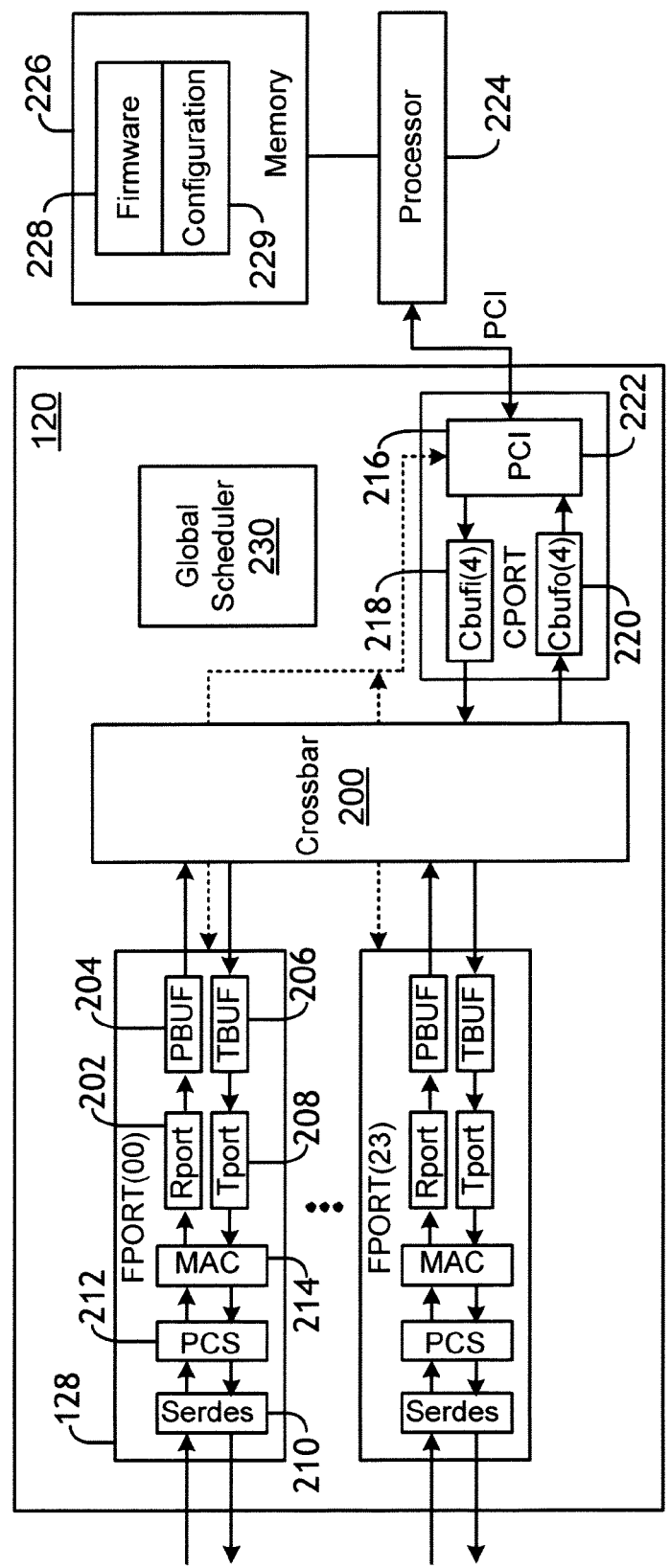
FIG. 2A is a functional block diagram of a switch element according to the present embodiments.

FIG. 2A is a high-level block diagram of switch element 120, also referred to as switch 120. Switch element 120 may be implemented as an application specific integrated circuit (ASIC) having a plurality of ports 128. Ports 128 are generic (GL) ports and may include N_Port, F_Port, FL_Port, E-Port, or any other port type. The ports 128 may be configured to operate as Fibre Channel, FCoE or Ethernet ports. In other words, depending upon what it is attached to, each GL port can function as any type of port. As an example, ports 128 of FIG. 2A are drawn on the same side of the switch element 120. However, ports 128 may be located on any or all sides of switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a control port (CPORT) 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time multiplexed pipeline for receiving frames (or information). The pipeline includes a serializer/deserializer (SERDES) 210, a physical coding sub-layer (PCS) 212, and a time multiplexed media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202).

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 may be used to stage frames or information related to frames before being transmitted. The TPORT 208 may share the MAC 214 and the PCS 212 with the RPORT 202. The SERDES 210 at TPORT 208 is used to convert parallel data into a serial stream (the SERDES 210 may also be shared with the RPORT 202).

The switch element 120 may also include the control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 may be used to store firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "base-port" that may have more than one network link available for receiving and transmitting information. Each network link allows the base-port to be configured into a plurality of sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel port, one four lane (i.e., quad lane) Ethernet port or one four lane (i.e., quad lane) Fibre Channel port. Port 128 uses some logic that is shared among the multiple sub-ports and some logic that is dedicated to each sub-port.

Figure 2B:
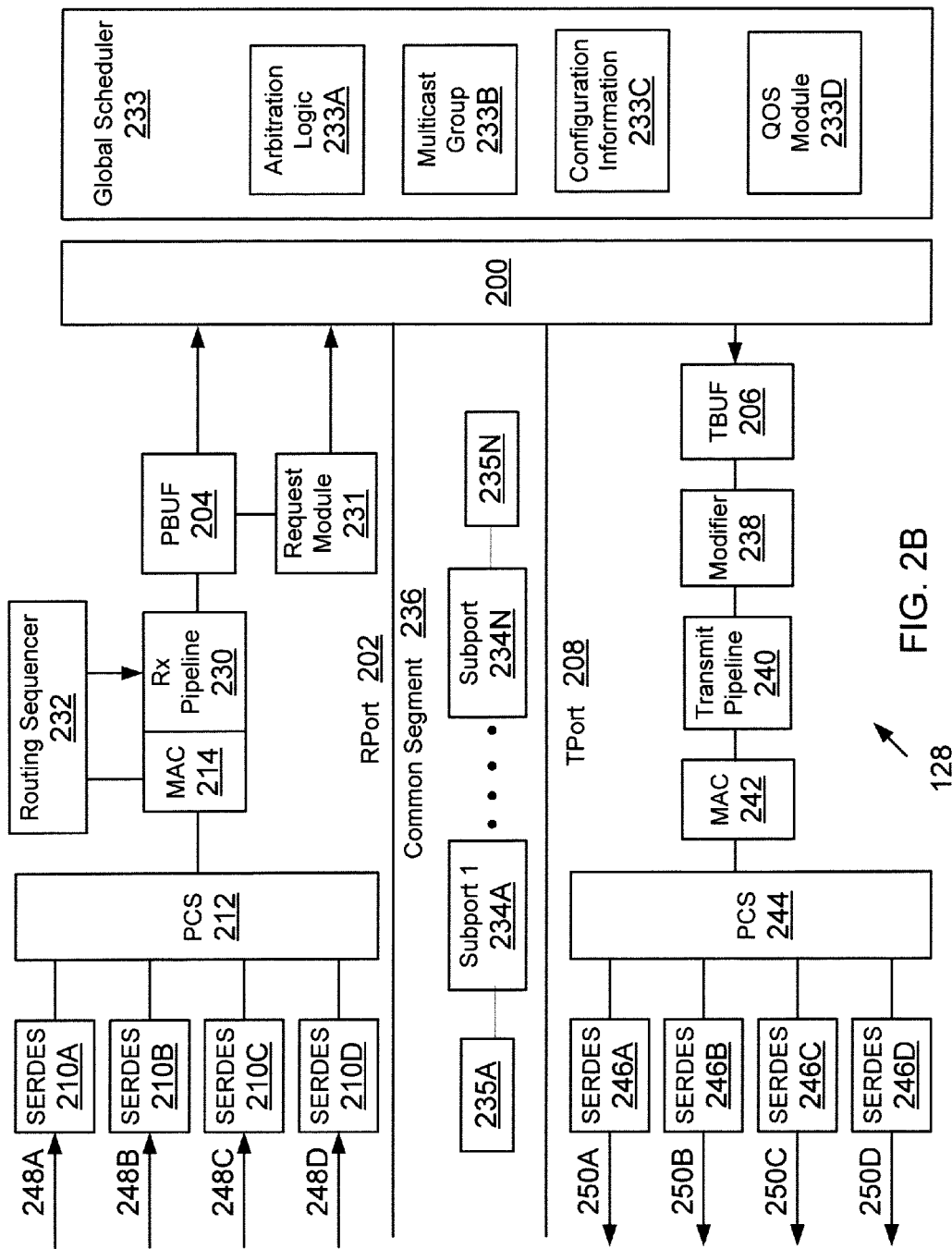
FIG. 2B shows a block diagram of a port, according to one embodiment.

FIG. 2B shows an example of base-port 128 having RPORT 202, TPORT 208 and a common segment 236, according to one embodiment. RPORT 202 is used for receiving and processing frames, while TPORT 208 is used for transmitting frames. Common segment 236 is used to store information that may be commonly used among different components of base-port 128.

In one embodiment, base-port may be configured to include a plurality of sub-ports. The configuration information/logic 234A-234N for each sub-port may be stored in common segment 236. The routing sequencer 232 may include routing look up tables or other data structures. A register 235A-235N is associated with the configuration information/logic 234A-234N for each sub-port.

RPORT 202 may include or have access to a plurality of network links, for example, four independent physical network links 248A-248D, each configured to operate as a portion of an independent sub-port within base-port 128. Each network link is coupled to a SERDES 210A-210D that share PCS 212 and MAC 214. The multiple lanes also share a receive pipeline (Rx pipeline) 230 that is used for pre-processing received frames before they are transferred. Both MAC 214 and receive pipelines 230 are time multiplexed so that they can be shared among the plurality of links based on how the ports are configured to operate. In one embodiment, MAC 214 and PCS 212 may be a part of the receive pipeline 230.

Incoming frames are received via one of the network links (or lanes) 248A-248D. The received frame is processed by the appropriate SERDES 210A-210D and then sent to the PCS 212. As the PCS 212 continues to process the frame, the frame is provide to MAC 214 that is time shared among a plurality of sub-ports. This means that for a certain time segment (for example, one or more clock cycles), MAC 214 may be used by one of the sub-ports. After the MAC module 214 processes the frame, the frame is sent to receive pipeline 230 that is also time shared. Information regarding the frame or a copy of the frame is also provided to a routing sequencer 232 that determines the destination of the received packets. In one embodiment, a frame whose destination is processor 224 is given the highest priority, followed by a frame that is routed by a TCAM (ternary content addressable memory) or steering registers located within the routing sequencer 232. It is noteworthy that more than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

When a sub-port is configured to operate as a Fibre Channel port, then credit is issued by the sub-port based on the space that is available at PBUF 204. The sub-port issues R_RDYs or VC_RDYs depending on whether virtual lanes are being used at any given time. When a sub-port is configured to operate as an Ethernet port, credit information based on the space that is available in a receive data buffer (PBUF 204) is conveyed through the transmission of pause frames.

To move frames from the receive queues; a request module 231 generates requests for a global scheduler 233, also referred to as scheduler 233. Request module 231 maintains a data structure (not shown) that tracks a number of requests that may be pending for each sub-port. Request module 231 also removes requests from the data structure when a grant is received for a particular request.

Scheduler 233 stores configuration information 233C for various ports and some of that information may be used to select requests. Scheduler 233 includes arbitration logic 233A that performs dual stage arbitration for requests from various base-ports. Scheduler 233 also maintains a data structure at a memory labeled as multicast group 233B. The data structure stores information for identifying multicast groups that may receive multicast frames (i.e., frames that are destined to multiple destinations). Scheduler 233 uses the information for processing requests that involve multicast frames. Scheduler 233 further includes a quality of service (QOS) module 233D that monitors QOS data.

Frames for transmission via TPORT 208 move via TBUF 206 and a modifier 238. In one embodiment, modifier 238 may be used to insert, modify or remove information from an outgoing frame. The modification is based on the frame type and transmit virtual queue. The time shared transmit pipeline 240 and MAC 242 are used to process outgoing frames. PCS 244, SERDES 246A-246D are used similar to PCS 212 and SERDES 210A-210D. Network links 250A-250D are similar to links 248A-248D, except links 250A-250D are used to transmit frames. It is noteworthy that although separate PCS and MAC have been shown for RPORT 202 and TPORT 208, some of the same PCS 212 and MAC 214 logic may be shared and used in the receive and transmit paths, as seen in FIG. 2A.

As described, sub-ports of switch element 120 may be configured to operate as independent Ethernet ports that are coupled to Ethernet links. The Ethernet links may operate at different rates, for example, 1G (gigabits/second), 10G, 20G, 40G and others. The following description provides for how a network device (in this example, a network switch capable of receiving/transmitting information over a network link) can receive/transmit 20G Ethernet information from/to a particular Ethernet link partner (that is, another network device capable of receiving/transmitting 20G Ethernet information over the network link such as, without limitation, a server, a peripheral, an input/output subsystem, a bridge, a hub, a router, or another switch) such that the network switch is able to identify a vendor (and associated propriety 20G Ethernet lane alignment markers) of the transmitting/receiving network device and use the vendor's own proprietary lane alignment markers when transmitting information to and/or receiving information from that particular link partner.

On multi-lane Ethernet links, lane alignment characters or markers are inserted into frames sent by a transmitting network device to allow a receiving network device to perform various tasks (e.g., recognizing a start of frame, removing lane skew, correctly ordering lanes and others.). The values for 40G Ethernet lane alignment marker (AM) designations are set in the IEEE Ethernet Standard as follows: lane 0 (M0,M1,M2 bytes)=907647 hex; lane 1 (M0,M1,M2 bytes)= F0C4E6 hex; lane 2 (M0,M1,M2 bytes)=C5659B hex; and lane 3 (M0,M1,M2 bytes)=A2793D hex.

The IEEE Ethernet Standard defines lane alignment markers for 40G Ethernet and does not define lane alignment marker values for Ethernet links operating at 20G. Due to lack of standard values for 20G Ethernet, different vendors that design and sell network devices have implemented their own proprietary lane alignment markers for 20G Ethernet communication. This has resulted in the use of different alignment markers for each of the 20G and 40G Ethernet rates.

As outlined in more detail below, firmware 228 of switch 120 can load in different lane alignment markers associated with different vendors. The alignment marker used to identify each lane is programmable. This allows the use of the alignment markers defined in the IEEE Ethernet standards for 40G, and for the use of proprietary alignment markers for dual lane 20G Ethernet lanes. Because the 20G Ethernet link rate is not part of the IEEE Ethernet standard, each vendor is free to implement its own lane alignment markers. However, the programmable character of the switch 120 allows the switch 120 to be configured to meet multiple proprietary versions as well as 40G standard alignment markers. Each lane of a port 128 can be programmed to recognize and process proprietary lane alignment markers in addition to the 40G standard alignment markers.

Figure 3:
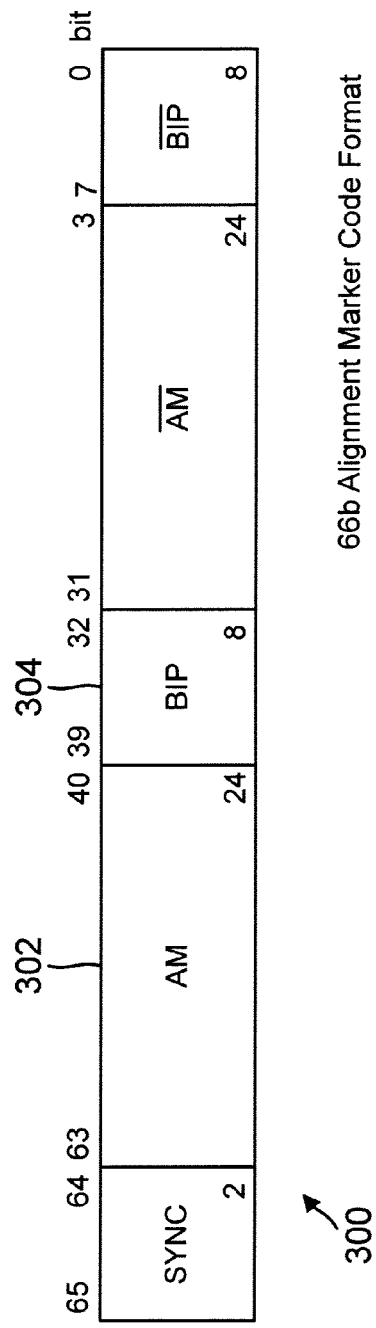
FIG. 3 shows a block diagram of a portion of a frame indicating lane alignment marker code format, according to one embodiment.

FIG. 3 shows an example of alignment marker code format 300 that may be used, according to one embodiment. As an example, alignment marker format 300 may include 66 bits of code. AM 302 indicates an alignment marker, while BIP 304 indicates bit interleaved parity for error checking. The AM values may be used to indicate the lane number, per the 40G Ethernet standard. For example, the standard provides that for lane 0, the M0, M1 and M2 bytes have a value of 907647 hex, for lane 1 the value is F0C4E6, for lane 2, the value is C5659B hex and for lane 3, the value is A2793D hex.

Figure 4:
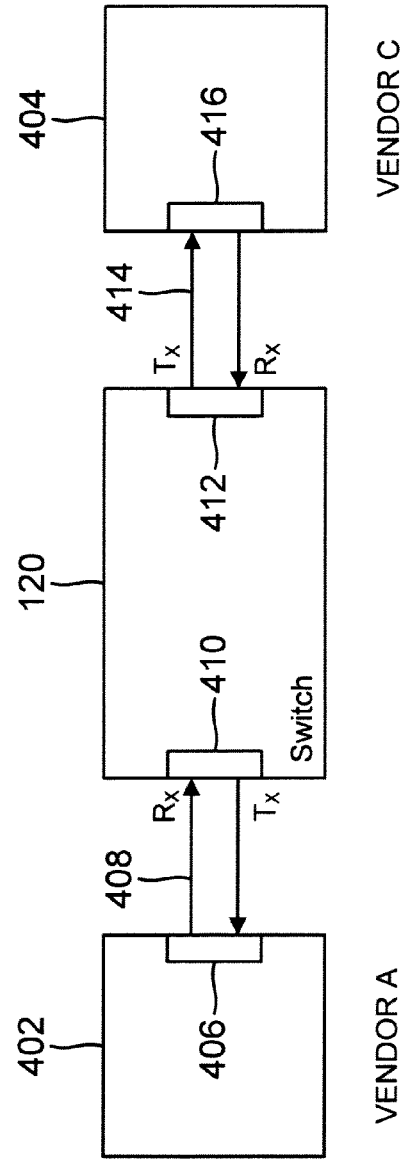
FIG. 4 shows a block diagram showing communication between two network devices through a network switch element, according to one embodiment.

FIG. 4 shows an example of communication between two network devices 402, 404 through ports (or sub-ports) of a network switch element 120, according to one embodiment. The switch 120 and network devices 402, 404 may be part of the system 100.

A transmitting or a source Ethernet port 406 of the first network device 402 is configured to transmit frames 408 to a receiving or destination port 410. The destination port 410 may be a base-port 128 or a sub-port of base-port 128. The ultimate destination of frames 408 is the second network device 404. A source port 412 (similar to base-port 128 or a sub-port of base-port 128) configured as an Ethernet port is configured to transmit frames 414 to a receiving or destination port 416 on the second network device 404. Likewise, Ethernet frames could be received at switch 120 from the second network device 404 that are destined for the first network device 402.

The processor 224 that executes firmware code 228 configures the destination port 410 after determining whether the link is configured for 40G or 20G Ethernet For 40G Ethernet frames, the processor 224 programs each register 235A-235D associated with one of the four sub-ports 234A-234D with a lane alignment marker as set forth in the IEEE Ethernet Standard. However, if the link is configured for 20G Ethernet, as mentioned above, since the IEEE Ethernet Standards does not set forth standardized lane alignment markers for 20G Ethernet, processor 224 identifies the particular vendor of the first network device 402. Once the vendor is identified, processor 224 programs the at least one dual lane port (i.e., the registers associated with the dual lane port with the proprietary 20G Ethernet lane alignment markers associated with that particular vendor. Memory 226 accessible to processor 224 is programmed with and stores a list of network device vendors and the proprietary 20G Ethernet lane alignment markers associated with each of the vendors.

As discussed below, port 410 negotiates with the first network device 402 to determine a lane alignment marker that is acceptable by the first network device 402 (i.e., lane alignment markers proprietary to that vendor for the specific lanes involved in the dual port). Based on that information, processor 224 programs port 410 with the proprietary lane alignment markers associated with the vendor of the first network device 402.

As mentioned above, the second network device 404 is the destination of the 20G Ethernet frames being received by the switch 120. Port 412 (i.e., a second port) of switch 120 may be configured by the processor 224 as at least dual lane port where each lane of the dual lane port is configured to receive and transmit frames.

Port 412 negotiates with port 416 of network device 404 to determine a lane alignment marker that is acceptable by the second network device 404. This information is provided to processor 224 that programs at least two of the sub-ports of the source port 412 with those lane alignment markers.

In this manner, the switch element 120 receives 20G Ethernet frames from the first network device 402 destined for the second network device 404. As the frames are processed by the switch 120, the lane alignment markers in the frames 408 from the first network device 402 are removed. In order to transmit the frames to the second network device 404, lane alignment markers associated with the vendor of the second network device 404 are inserted into frames 414 prior to transmission to the second network device 404. In this manner, the switch 120 acts as a bridge between the first and second network devices 402, 404; translating the data from one vendor's 20G Ethernet proprietary alignment markers to the other's 20G Ethernet proprietary alignment markers.

Figure 5:
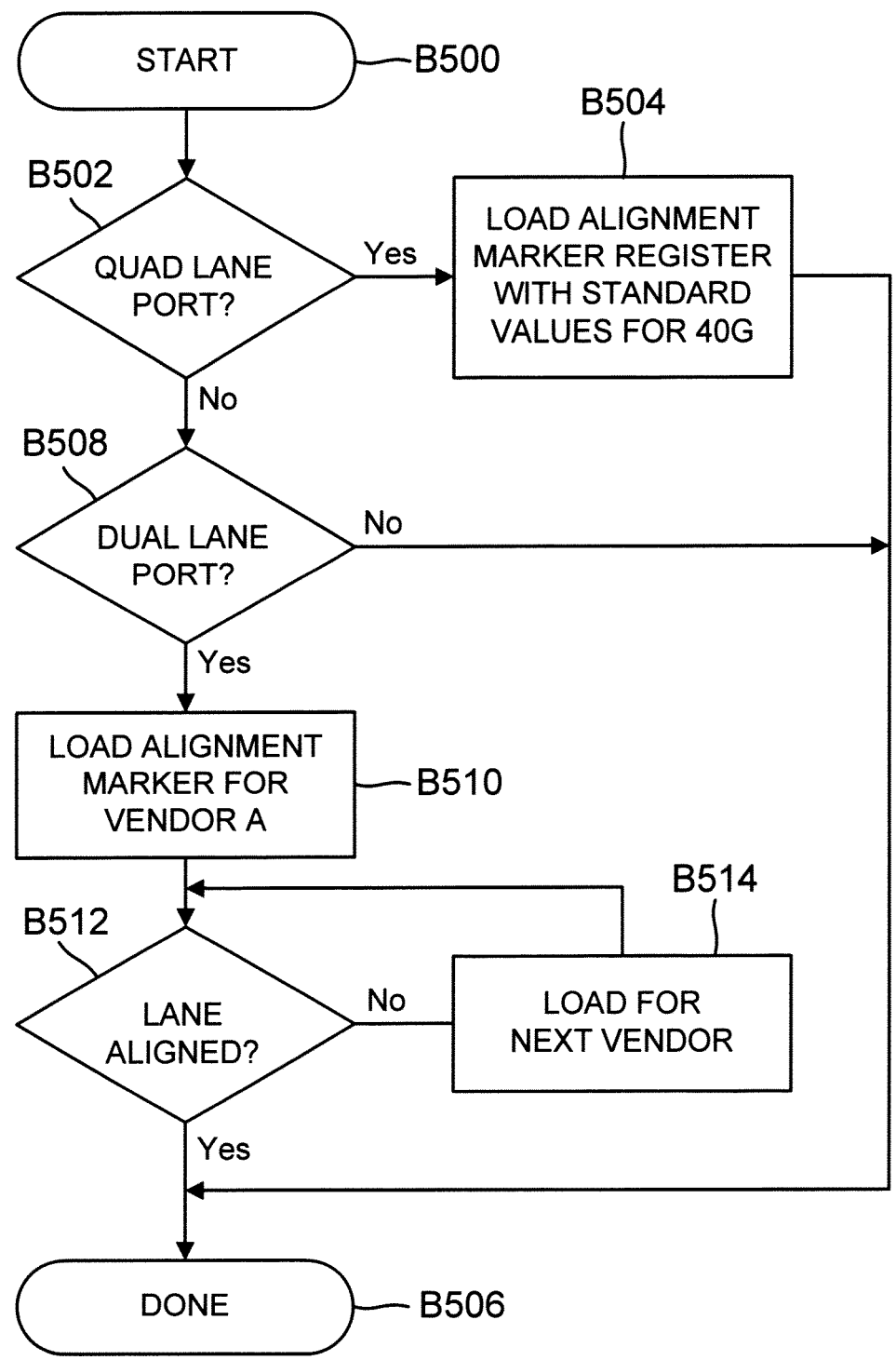
FIG. 5 shows a process flow diagram, according to an embodiment

FIG. 5 shows a process, according to one embodiment, for programming a sub-port with lane alignment markers associated with a particular vendor. The process steps may be executed by processor 224 of the switch element 120. The process begins in block B500 (with the assumption that a determination has already been made that the port 128 is dealing with Ethernet frames). In block B502, the process determines if port 128 operating as a receiving port has been configured as a quad lane port. If yes, then in block B504, the particular register 235A associated with the sub-port are programmed with associated lane alignment marker values in accordance with 40G Ethernet frames, as set forth in the IEEE Ethernet standard and the process proceeds to block B506. However, if the port 128 (i.e. 410) is not configured as a quad lane port, in block B508 the process determines if the port 128 is configured as at least a dual lane port. If the port 128 is not configured as at least a dual lane port, the process proceeds to block B506.

If the port 128 is configured as at least a dual lane port, in block B510, the process programs the particular register 235A associated with the two sub-ports configured as dual lane with proprietary 20G Ethernet lane alignment marker values associated with a first vendor, for example, the vendor for network device 402. In block B512, the process determines if the lanes are aligned. If the lanes are aligned, the process proceeds to block B506, where the process ends.

However, if the lanes are not aligned, in block B514, the particular register 235A associated with the two sub-ports with proprietary 20G Ethernet lane alignment marker values associated with a second vendor are loaded, and the process loops back to block B512 to determine if the lanes are aligned. If the lanes are still not aligned, the process again proceeds to block B514 to load the registers with 20G Ethernet lane alignment markers associated with yet another vendor and again loops back to block B512 to determine if the lanes are aligned. The process repeats until the process determines in block B512 that the lanes are aligned. In one embodiment, once all of the known vendor alignment markers have been tried without achieving alignment the process loops back to the beginning of the list and tries again. In yet another embodiment, processing back through the list of known vendor alignment markers without achieving alignment continues until some programmable limit on the number of tries or the elapsed time is exceeded then an error is generated to processor 224.

Figure 6:
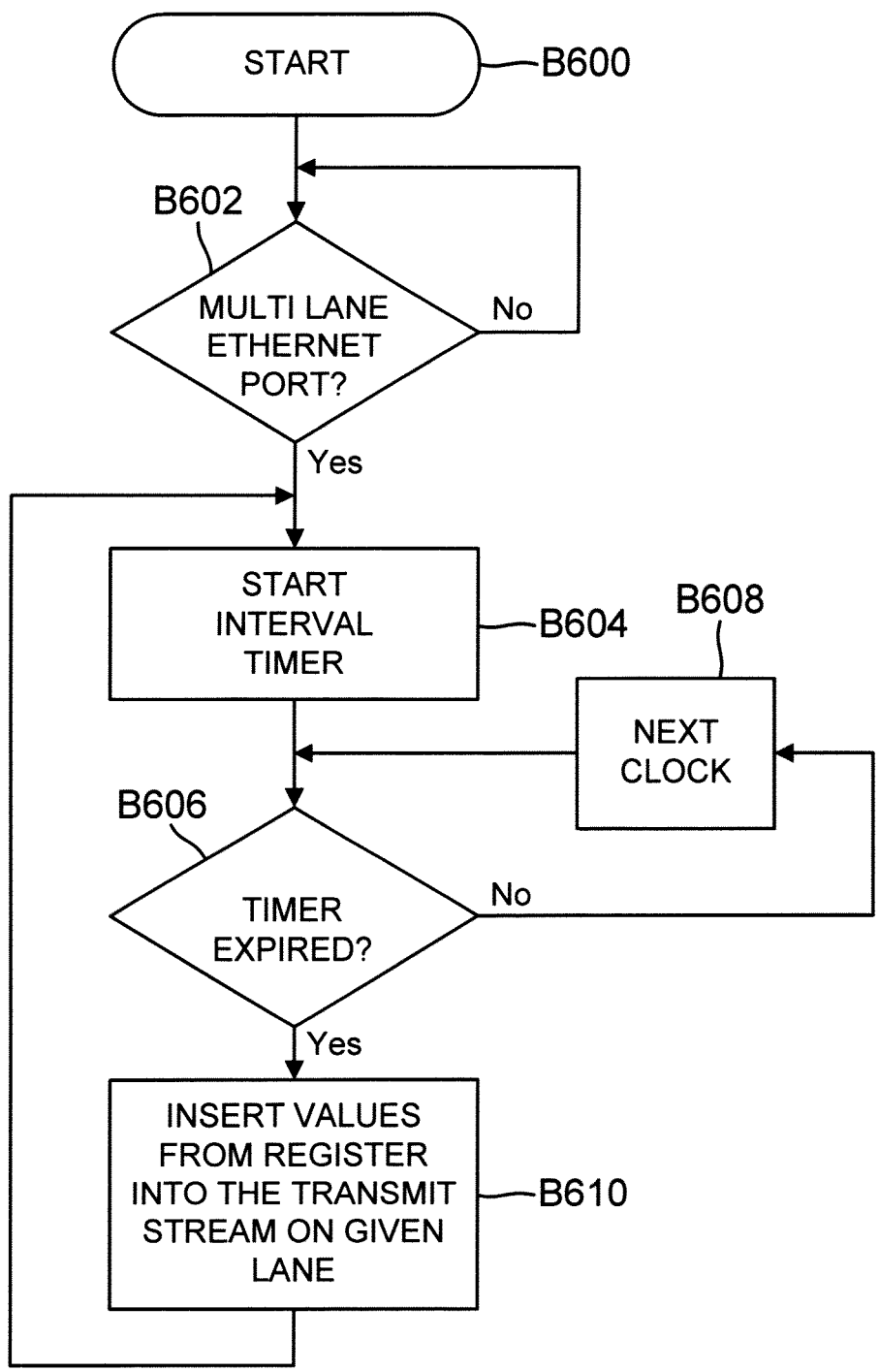
FIG. 6 shows a process flow diagram, according to an embodiment.

FIG. 6 shows a process, according to one embodiment where Ethernet lane alignment markers are inserted in frames 414 being transmitted from switch 120 to network device 404. The process begins in block B600. In block B602, the process detellnines if the port 128 (i.e. port 412 of FIG. 4) is configured as a multilane Ethernet port. If not, the process loops back to block B602 until the process determines that the port 128 is configured as a multilane Ethernet port. As described above, processor 224 determines what lane alignment markers are appropriate and programs the appropriate registers (e.g., registers 235A, 235B) associated with the involved sub-ports with the lane alignment markers. The transmission of frames includes inserting 20G Ethernet lane alignment markers into the data prior to transmission at a designated periodicity. In block B604, an interval timer (not shown) is started. The interval timer may be based in TPORT 208 in general and associated with TBUF 206 in particular. Then, in block B606, it is determined if the interval timer has expired. If not, then in block B608, the process waits for the next clock cycle and loops back to block B606 where the process will continue in this manner until the timer has expired. If the timer has expired, then in block B610 the process inserts values associated with the lane alignment markers from the register associated with the particular sub-port of the multilane Ethernet port into the traffic stream on a given lane, and the process then loops back to block B604. This process is the same whether the port is configured as 20G Ethernet or 40G Ethernet. Just the values loaded into the lane marker registers may be different.

Figure 7:
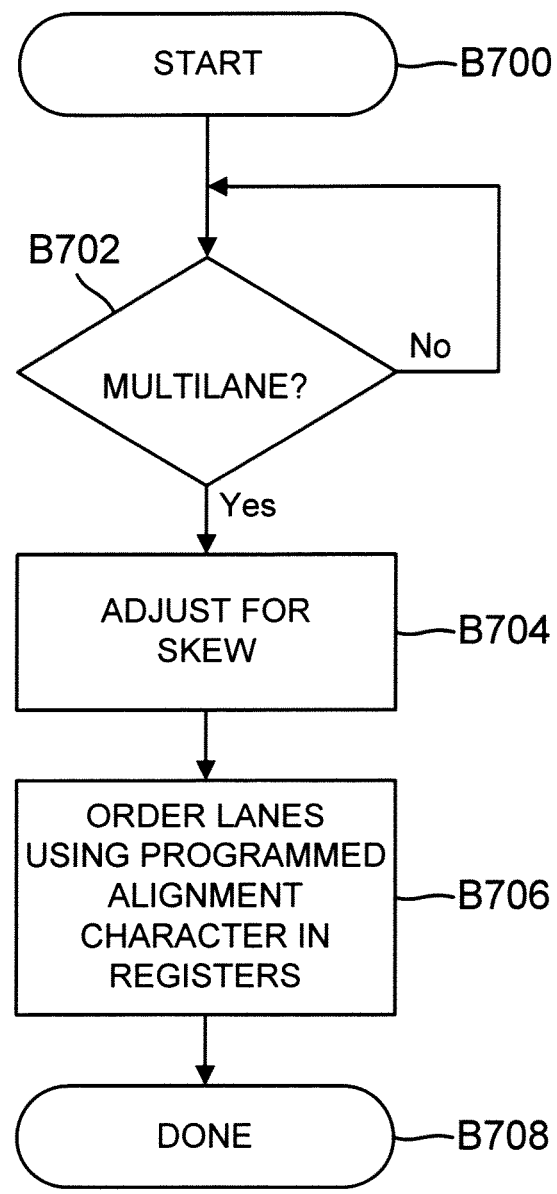
FIG. 7 shows a process flow diagram, according to another embodiment.

FIG. 7 shows a process, according to one embodiment where received Ethernet lane alignment markers are used to order lanes. The process begins in block B700. In block B702, the process determines if a receiving sub-port is configured as a multilane Ethernet port. If not, the process loops back to block B702 until the process determines that the port 128 is configured as a multilane Ethernet port. As described above, processor 224 determines what lane alignment markers are appropriate and programs the appropriate registers (e.g., registers 235A, 235B) associated with the involved sub-ports with the lane alignment markers. In block B704, the lanes of the port 128 are adjusted for skew in the PCS 212. Then, in block B706, the PCS 212 orders the lanes using programmed alignment characters in the registers and the process is done (block B708). This process is the same whether the port is configured as 20G Ethernet or 40G Ethernet. Just the values loaded into the lane marker registers may be different.

The embodiments disclosed herein have various advantages. For example, the programmable character of the switch 120 allows the switch 120 to be configured to meet multiple proprietary versions as well as 40G standard alignment markers. Furthermore, each lane can be programmed to recognize and process proprietary lane alignment markers in addition to the 40G standard alignment markers. As stated above, this allows the switch to act as a bridge between two network devices where each device is made by a different vendor having its own proprietary lane alignment markers for 20G Ethernet.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in any network device including adapters, network interface cards and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A method for setting lane alignment markers in a network switch element connected to a first network device via a first port of the network switch element and a second network device via a second port, comprising:
    storing proprietary lane alignment markers for a plurality of network devices provided by a plurality of vendors, where the proprietary lane alignment markers are used by the plurality of network devices for communicating at an operating speed for which standard protocol lane markers are unavailable;
    configuring the first port having a plurality of sub-ports, as at least a dual lane port where each lane of the dual lane port is configured to receive and transmit frames and a dual lane port operating speed does not use standard protocol defined lane markers for communication;
    retrieving a first lane alignment marker for a vendor for the first network device;
    using the first lane alignment marker to communicate with the first network device;
    iteratively testing other lane alignment markers for communication with the first network device, when use of the first lane marker does not result in aligned lanes for the first port; and
    programming the first port to identify a successful lane alignment marker that resulted in aligned lanes for the first port and is associated with the vendor of the first network device for processing frames received from the first network device and transmitted to the first network device.

2. The method of claim 1, wherein the first network device communicates with the first port using an Ethernet link operating at a rate of 20 gigabits/second (G).

3. The method of claim 2, wherein the lane markers for 20G are proprietary to the vendor of the first network device.

4. The method of claim 2, further comprising:
    receiving frames from the first network device destined for the second network device using Ethernet links operating at 20G; and
    replacing the successful lane alignment marker in the frames received from the first network device with a lane alignment marker acceptable to the second network device prior to transmitting frames to the second network device.

5. The method of claim 4, wherein the replaced lane alignment marker is proprietary to a vendor of the second network device.

6. The method of claim 1, wherein the successful lane alignment marker for the vendor of the first network device is stored at a common segment of the network switch element that stores configuration information regarding the plurality of sub-ports.

7. The method of claim 6, wherein the successful lane alignment marker is stored at a register.

8. A system, comprising:
    a first network device coupled to a first port of a network switch element;
    a second network device coupled to a second port of the network switch element;
    wherein the network switch element stores proprietary lane alignment markers for a plurality of network devices provided by a plurality of vendors, where the proprietary lane alignment markers are used by the plurality of network devices for communicating at an operating speed for which standard protocol lane markers are unavailable;

wherein the first port having a plurality of sub-ports is configured as at least a dual lane port where each lane of the dual lane port is configured to receive and transmit frames and a dual lane port operating speed does not use standard protocol defined lane markers for communication; and wherein the network switch element retrieves a first lane alignment marker for a vendor for the first network device, uses the first lane alignment marker to communicate with the first network device, iteratively tests other lane alignment markers for communication with the first network device, when use of the first lane marker does not result in aligned lanes for the first port; and stores a successful lane alignment marker that resulted in aligned lanes for the first port and is associated with the vendor of the first network device for processing frames received from the first network device and transmitted to the first network device.

9. The system of claim 8, wherein the first network device communicates with the first port using an Ethernet link operating at a rate of 20 gigabits/second (G).

10. The system of claim 9, wherein the lane alignment marker for 20G are proprietary to the vendor of the first network device.

11. The system of claim 8, wherein the first port receives frames from the first network device destined for the second network device using Ethernet links operating at 20G; and the first port replaces the successful lane alignment marker in the frames from the first network device with a lane alignment marker acceptable to the second network device prior to transmitting frames to the second network device.

12. The system of claim 11, wherein the replaced lane alignment marker are proprietary to a vendor of the second network device.

13. The system of claim 8, wherein the successful lane alignment marker for the vendor of the first network device is stored at a common segment of the network switch element that stores configuration information regarding the plurality of sub-ports.

14. The system of claim 13, wherein the successful lane alignment marker is stored at a register.

15. A network switch element, comprising:
a processor for executing firmware code out of a memory for managing network device operations; wherein the memory stores proprietary lane alignment markers for a plurality of network devices provided by a plurality of vendors, where the proprietary lane alignment markers are used by the plurality of network devices for communicating at an operating speed for which standard protocol lane markers are unavailable; and a first port coupled to a first network device, where the first port having a plurality of sub-ports is configured as at least a dual lane port where each lane of the dual lane port is configured to receive and transmit frames and a dual lane port operating speed does not use standard protocol defined lane markers for communication;

wherein the network switch element retrieves a first lane alignment marker for a vendor for the first network device, uses the first lane alignment marker to communicate with the first network device, iteratively tests other lane alignment markers for communication with the first network device, when use of the first lane marker does not result in aligned lanes for the first port; and stores a successful lane alignment marker that resulted in aligned lanes for the first port and is associated with the vendor of the first network device for processing frames received from the first network device and transmitted to the first network devices.

16. The network switch element of claim 15, wherein the first network device communicates with the first port using an Ethernet link operating at a rate of 20 gigabits/second (G).

17. The network switch element of claim 16, wherein the lane alignment marker for 20G are proprietary to the vendor of the first network device.

18. The network switch element of claim 15, wherein the first port receives frames from the first network device destined for a second network device using Ethernet links operating at 20G; and the first port replaces the successful lane alignment marker in the frames from the first network device with a lane alignment marker acceptable to the second network device prior to transmitting frames to the second network device.

19. The network switch element of claim 18, wherein the replaced lane alignment marker are proprietary to a vendor of the second network device.

20. The network switch element of claim 15, wherein the successful lane alignment marker for the vendor of the first network device is stored at a register of a common segment of the network switch element that stores configuration information regarding the plurality of sub-ports.

* * * * *